United States Patent [19]

Wurtz

[11] Patent Number: 4,997,572

[45] Date of Patent: Mar. 5, 1991

[54] HIGH RATE METHOD FOR ALKALINE STABILIZATION, BENEFICIATING AND PELLETIZING OF WASTEWATER TREATMENT PLANT SLUDGES

[75] Inventor: William O. Wurtz, Paramus, N.J.

[73] Assignee: Willow Technology, Inc., Paramus, N.J.

[21] Appl. No.: 546,426

[22] Filed: Jun. 29, 1990

[51] Int. Cl.$^5$ ............................ C02F 11/14; C05F 3/00
[52] U.S. Cl. ...................................... 210/710; 210/718; 210/738; 210/750; 210/751; 210/764; 71/12; 71/21; 71/903
[58] Field of Search ............... 210/609, 631, 710, 718, 210/716, 717, 724, 737, 738, 750, 751, 764, 769, 770, 774, 780; 71/12, 13, 21, 24, 64.05, 64.07, 903

[56] References Cited

U.S. PATENT DOCUMENTS

| | | | |
|---|---|---|---|
| 3,877,920 | 4/1975 | Carlberg | 71/21 |
| 3,941,357 | 3/1976 | Wurtz | 366/91 |
| 3,962,080 | 6/1976 | Dulin et al. | 210/751 |
| 4,226,712 | 10/1980 | Kamei | 210/710 |
| 4,270,279 | 6/1981 | Roediger | 210/609 |
| 4,306,978 | 12/1981 | Wurtz | 210/750 |
| 4,554,002 | 11/1985 | Nicholson | 71/12 |
| 4,872,998 | 10/1989 | Dausman et al. | 210/710 |

OTHER PUBLICATIONS

Dr. Hanns Roediger, "Using Quicklime", Apr. 1987 (p. 18–22).
Thomas L. Kovacik, "Sludge, Kiln Dust Make Fertilizer", Dec. 1988, (p. 27–32).
Dale E. Baker et al., "Kiln Dust From Cement Factories for Vacuum Filter Processing of Sewage Sludge", (p. 28–30).
F. B. Leopold Co., Inc., "Willowtech Plow Blenders", Bulletin 1989.
F. B. Leopold Co., Inc., Pilot Test, 10/31/86.

Primary Examiner—Tom Wyse
Attorney, Agent, or Firm—Collard, Roe & Galgano

[57] ABSTRACT

The present invention relates to a high rate method for combining waste materials to produce valuable products for agricultural, horticultural, sylvicultural or public use. Specifically, the present invention combines the steps of alkaline stabilization, beneficiating and pelletizing waste materials, such as wastewater treatment plant sludge or animal excrement and reaction with carbon dioxide, to thereby convert the waste materials to useful products such as soil conditioners or fertilizer supplements.

7 Claims, 1 Drawing Sheet

HIGH RATE METHOD FOR ALKALINE STABILIZATION, BENEFICIATING AND PELLETIZING OF WASTEWATER TREATMENT PLANT SLUDGES

BACKGROUND OF THE INVENTION

1. Field of the Invention

The present invention relates to an improved, high rate method for combining waste materials to produce valuable products for agricultural, horticultural, sylvicultural or public use. Specifically, the present invention combines the steps of alkaline stabilization, beneficiating and pelletizing waste materials, such as wastewater treatment plant sludge or animal excrement and reaction with carbon dioxide, to thereby convert said waste materials to useful products such as soil conditioners or fertilizer supplements.

2. The Prior Art

Those skilled in sludge management practice are aware that methods for alkaline stabilization of dewatered sludge, beneficiating of waste materials and pelletizing of sludge are presently in use as separate and distinct processes. Environmental Protection Agency (EPA) publications that have reviewed stabilization and disinfection of municipal wastewater treatment plant sludges using alkaline materials conclude that alkaline stabilization has been demonstrated to effectively eliminate odors, improve bacterial and pathogenic organism control, provide stable material for application to agricultural land and provide alternate or supplemental treatment for existing facilities which are out of service due to overload, cleaning or repair.

In U.S. Pat. No. 4,306,978, dated Dec. 22, 1981, entitled "Method for Lime Stabilization of Wastewater Treatment Plant Sludges", granted to the applicant, the subject matter of which is incorporated herein by reference thereto, a method for lime stabilization of wastewater treatment plant sludge is disclosed, this method including the steps of dewatering sludge and rapidly and intimately mixing and reacting sludge cake with quicklime (calcium oxide) so as to produce stabilized sludge pellets.

The aforesaid patented method is advantageously and efficiently accomplished in a blender-dryer-reactor invented by the applicant and described in U.S. Pat. No. 3,941,357. This method has been widely accepted by the pollution control industry with many successful installations in the United States. Consulting Engineering firms have tabulated and reported data indicating the ability to alkaline stabilize dewatered sludge cake using the applicant's aforesaid method in as little time as ten seconds while still resulting in the complete destruction of pathogens. The performance was so outstanding as compared to other presently existing methods that plans and specifications prepared by the engineering consultants for a major city specified that applicant's method and apparatus be purchased on a "sole source" basis, that is, without competitive bidding even though it was a municipal project.

The new, high rate, improved method takes advantage of an embodiment of the applicant's present patented method in that the first step of the new method is to prepare a stabilized paste of the reacted materials, not pellets as taught by the present, patented method of the applicant. This initial step of preparing a pasty material is then further combined with additional, novel steps of beneficiating, pelletizing and high-rate curing of pellets to accomplish the new method.

In U.S. Pat. No. 4,270,279 dated June 2, 1981, Roediger also teaches a method for alkaline stabilization of dewatered sludge cake which results in the formation of pellets. The object is that an inexpensive method is provided for sterilizing dewatered sludge cake which is discharged from belt presses wherein the sludge cake is broken into ball-like particles having diameters ranging from 1 to 10 millimeters, and coating these particles with quicklime (calcium oxide). The quicklime reacts exothermically with the surfaces of said ball-like particles resulting in a product which can be used as an agricultural fertilizer. The means for mixing and reacting the sludge with quicklime includes a paddle blender or pug mill.

Also, the beneficiating of wastewater treatment plant sludge has been well known by those skilled in sludge management. As reported in Compost Science Magazine, July/August 1975 issue, Messrs Baker, Welch, Stout and Doty of Pennsylvania State University concluded, as a result of test work, that a waste material, cement kiln dust, could advantageously be utilized in place of other alkaline materials for processing sewage sludge. And, they reported that beneficiating of the dewatered filter cake also took place when cement kiln dust was added. This is due to the nutrients, such as potassium and magnesium, which are contained in cement kiln dust, combining with the valuable nitrogen, phosphorus, trace minerals and organic matter of sludge so as to be advantageous for crop production when applied to land.

U.S. Pat. No. 4,554,002 granted to Nicholson discloses a method for beneficiating "low percentage solids" waste water treatment sludge, without prior dewatering, by mixing kiln dust containing a percentage of calcium oxide, without compacting said mixture, and aging for sufficient period of time to produce a product which can be applied to land as well as use as a soil conditioner and fertilizer supplement.

The aforesaid separate process methods are presently in practice today, but all have limitations. Because of the increasing demand for viable alternatives for disposing of wastewater treatment plant sludges and the promotion of practices that provide for the beneficial use of sludge, the new method of the invention addresses the deficiencies of the prior art methods and combines the processes with a novel high-rate curing step to provide a valuable product from the aforesaid waste materials.

A limitation of all prior art methods is the inability to rapidly process a uniform, beneficiated product that can reduce or eliminate the relatively long storage and curing periods to thereby prepare a product for immediate beneficial uses. None of the prior art methods provide a product with an initially high green strength. High green strength is defined as the physical condition of the pellets or product which can withstand sufficient compressive and shear forces so as not to fracture or break down when handled with mechanical equipment, such as a mechanical spreader used for dispersing material for land application. The inability of prior art methods to form uniform pellets with high green strength is due to many factors, such as continuous variations of the sludge; variations of the additive waste material components to the mixture; variable calcium oxide content of the waste materials such as kiln dusts; the retention time that the material is acted upon in the mixer-reactor with resultant variations in shear forces; speed changes for increased or decreased flow rates also producing variable shear forces and changes of viscosity of the processed material. Most plant operators cannot respond to these many variations which, in effect, has prevented the combining of the steps of stabilizing, beneficiating and pelletizing of the waste materials so as to result in a product of uniform particle size, beneficiated, with high green strength, and yet still efficiently produced and cost effective.

As an example of the limitations of the prior art methods, Water/Engineering & Management Magazine, December, 1988 issue, reported that the beneficiating method of U.S. Pat. No. 4,554,002 required approximately three days for disinfection and approximately seven days to produce a friable stage of the resultant product so that the product could be granulated. In U.S. Pat. No. 4,270,279, the Roediger method specifies time for completion of the process and specifies an additional process step of storing the product for about four additional hours so as to increase the pellet green strength. Additionally, the pellet size as taught by Roediger is 1 to 10 millimeters in diameter which, relatively speaking, is nonuniform as compared to the pellet size of the method of the invention.

Each of the aforesaid stabilization methods have many individual limitations and disadvantages when compared with the method according to the invention as hereinafter described.

A severe limitation of the prior art methods is the need to store the resultant sludge mixtures for relatively long periods of time to provide sufficient curing to enable material handling when applying the products of the methods to land by means of conventional equipment. This requirement to store material therefor requires costly land storage area as well as additional labor and material handling equipment to transport material to and from the storage area. This storage period is mandatory for proper preparation of the reacted materials when using prior art methods. It is believed that an additional chemical reaction takes place during the storage and curing period. The chemical reaction is a relatively slow reaction between calcium hydroxide contained in the stabilized sludge and the small amount of carbon dioxide in the atmosphere. This reaction will thereby form calcium carbonate.

For a better understanding, a brief review of the chemical reactions involved follows: First, for stabilization and disinfection of sludge, an alkaline material such as calcium oxide (quicklime) or waste materials containing calcium oxide, such as kiln dusts, are added to dewatered sludge. The calcium oxide reacts exothermically with the free water of each sludge particle and forms calcium hydroxide plus heat.

As an alternate alkaline material, calcium hydroxide, commonly called hydrated lime, can be used for stabilization in lieu of calcium oxide. In either case, the resultant sludge mixture contains calcium hydroxide. During storage, or enhanced by mechanical aeration, the calcium hydroxide will react slowly with carbon dioxide in the atmosphere to form calcium carbonate.

It is well known however, that the atmosphere only contains 0.035% carbon dioxide. Therefore, for example, the Nicholson method requires up to seven days of curing and storage to prepare the product for use, this actual requirement due to the limited availability of carbon dioxide. This extremely slow prior art reaction rate can be compared with the new, high-rate method according to the invention wherein the reaction and formation of calcium carbonate is immediate by means of the use of 100% carbon dioxide or up to 100% carbon dioxide. This is contrasted with relying on the extremely low percentage of carbon dioxide in the atmosphere as in prior art methods. Thus, the need to store and cure reacted materials prior to use is eliminated, thereby overcoming a major limitation of prior art methods.

SUMMARY OF THE INVENTION

Accordingly, it is an object of the present invention to provide a novel, improved, high-rate method for reacting alkaline materials with dewatered wastewater treatment plant sludge cake, or animal excrement, in a compartmented reactor for disinfection, stabilization, beneficiating, pelletizing and use in a high-rate, efficient, cost effective manner so as to promote sludge management practice that provides for beneficial use of sludge, while improving environmental quality and protecting human health.

It is a further object of the invention to combine the aforementioned steps to convert waste materials into valuable products for utilization as a soil conditioner, or fertilizer supplement, in agricultural applications for food and feed crops; for horticultural applications such as plants and use in nurseries; for sylviculture to increase forest productivity and revegetate forest lands devastated by fire, land slides, volcanos or other natural disasters; or public use such as turf maintenance or production, strip mine reclamation, covering expired landfills, or fertilizing highway median strips.

It is a more particular object of the invention to combine said aforesaid steps to effect alkaline stabilization, beneficiating and pellet formation in such a manner that the resultant pellets have high green strength and therefore can be handled in mechanical equipment for immediate beneficial use without need for extended storage and curing.

It is also an object of the present invention to synergistically combine waste materials such as sludge and kiln dusts to effect soil conditioners and fertilizer supplements containing nitrogen, phosphorus, potassium, trace nutrients and organic matter, as well as calcium from calcium carbonate, said calcium carbonate is known to degrade more slowly thereby providing beneficial slow release of alkalinity to cropland as compared to the faster release of hydrated lime.

It is still a further object of the invention to satisfy EPA regulations for sludge disinfection and stabilization which regulations require an increase in pH value of 11 to 13 and preferably pH 12 for two hours followed by maintaining a pH of at least no less than pH 11.5 for a additional 22 hours.

It is yet another object of the invention to immediately release and desorb gaseous ammonia contained in sludge thereby not permitting noxious, delayed reactions which later release ammonia gas in roll-off containers, dump trucks or at the landfill.

It is a further object of the invention to provide a viable, low cost, alternate method of sludge management to avoid potential eutrophication of streams, ponds and lakes, pollution problems resulting from landfilling, as well as the avoidance of pollution of oceans and waterways stemming from the prior art practices of ocean dumping of sludge or the discharge of sludge directly into waterways.

The above objects are accomplished in accordance with the present invention by providing a method for reacting alkaline materials, such as calcium oxide, calcium hydroxide, cement kiln dust, lime kiln dust or similar alkaline materials and combinations thereof with dewatered wastewater sludge cake or animal excrement in a compartmented reactor, and then reaction with carbon dioxide, said reactor providing disinfection, stabilization, beneficiating and pelletizing of said products in a high rate, efficient, cost effective manner so as to promote sludge management practices that provide for beneficial use of waste materials while improving environmental quality and protecting human health.

Certain of the foregoing and related objects are readily attained in a method for the alkaline stabilization, beneficiating and pelletizing of wastewater sludge or animal excrement in a single apparatus, which method comprises the steps of settling or dewatering sludge so as to provide sludge cake containing 3% to 60% by weight of dry solids based upon the total weight with the balance up to 100% by weight being water-based upon the total weight;

blending and reacting this sludge cake with calcium oxide added in a first compartment zone of a blender-reactor to form calcium hydroxide;

forming a pasty sludge mixture of sludge particles, thereby assuring a high pH of 11 to 13 for each sludge particle for disinfection and stabilization of the sludge as well as attaining the high pH necessary for the release of ammonia gas; said particles having free water at the surface thereof;

overflowing the pasty sludge mixture into a second compartment zone of the blender-reactor to continue the reaction of calcium oxide with the free water at the surface of each particle to thereby continue to form calcium hydroxide and raise the pH of the mixture to said high selected pH, and wherein in said second compartment, beneficiating materials are charged to produce coated sludge pellets, which pellets are thereby supplemented with additional nutrients contained in the beneficiating material to improve the products value for agricultural, horticultural or sylvicultural purposes;

overflowing the coated sludge pellets into a third compartment zone of the blender-reactor and reacting said pellets with carbon dioxide gas added to said third compartment while continually exposing pellet surface to said gas, thereby immediately forming calcium carbonate as a result of the reaction of calcium hydroxide and carbon dioxide gas, said carbonate forming a cementitious, hard skin on the pellet surface thereby providing high green strength for said pellet; and discharging said pellets for immediate handling by mechanical equipment without breakdown of the pellets.

Preferably, quicklime is added to compartment one for stabilization in an amount of from 5% to 40% by weight based upon the weight of the dry solids contained in the sludge. Additionally, the beneficiating materials may include kiln dusts containing calcium oxide (quicklime) which also aid in increasing the pH to 11 to 13, wherein pH 12 is preferable. These beneficiating materials are generally added in amounts ranging form 10% by weight to 60% by weight, based upon the total weight of the sludge. These proportions are dependent upon the chemical analysis of the beneficiating material as to the contained percentage of calcium oxide. For example, the calcium oxide content of kiln dusts can range from 25% to 55% of the total weight of the kiln dust.

The duration of blending and reacting to assure paste formation is preferably 30 seconds to 4 minutes in compartment one, beneficiating and pellet formation of 10 seconds to 4 minutes in compartment two, and gasing with carbon dioxide from 10 seconds to 5 minutes in compartment three.

The means for settling and dewatering the sludges can be any conventional water removal or dewatering equipment. The means for blending and reacting includes a conventional, efficient blender-reactor divided by two baffle plates to provide three compartments. The blender-reactor could be a single shaft or dual shaft paddle blender, pug mill or plow blender. However, the preferred embodiment is a dual shaft plow blender as described in U.S. Pat. No. 3,941,357 granted to the applicant, which apparatus is further described in U.S. Pat. No. 4,306,978 as a blender-reactor for use in a method for stabilizing sludge. These patents and methods are incorporated herein by reference thereto.

BRIEF DESCRIPTION OF THE DRAWINGS

Other objects and features of the present invention will become apparent from the following detailed description when taken in connection with the accompanying drawings, which drawings disclose one embodiment of the invention. It is to be understood that the drawings are designed for the purposes of illustration only, and are not intended as a definition of the limits of the invention.

DETAILED DESCRIPTION OF PREFERRED EMBODIMENT

Figure 1:
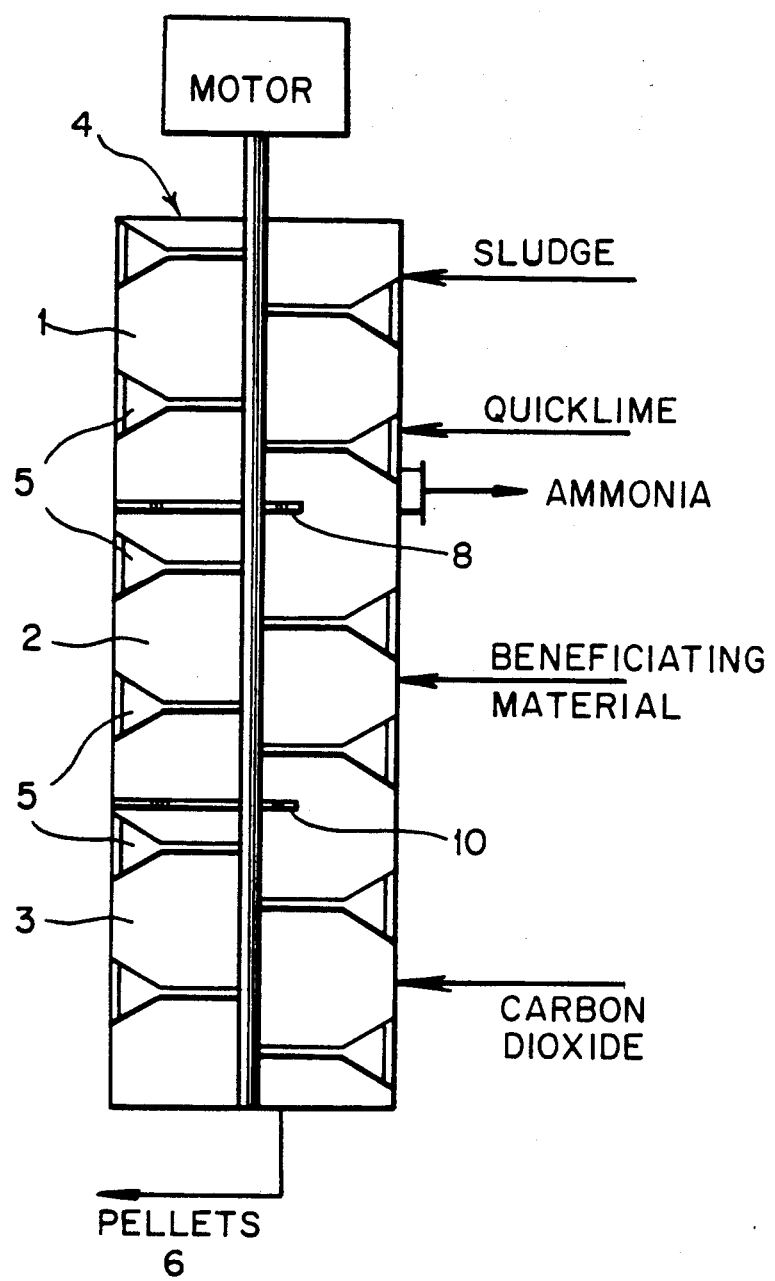
FIG. 1 is a flow diagram for the production of stabilized, beneficiated and pelletized sludge according to the present invention.

Turning now to the drawing, FIG. 1 shows that settled sludge or dewatered sludge cake containing 3% to 60% by weight based upon the total weight of dry solids is charged into compartment 1 of a blender-reactor, 4, to which calcium oxide, in the form of quicklime, is also charged. The balance by weight up to 100% is water. This will effect an efficient, accurate blending and reacting of the sludge with the calcium oxide so as to accomplish alkaline stabilization thereof. The sludge cake is at room temperature, but could be from 15° to 30° C. As compared to the applicant's previously patented method, this reaction is continued for more than 30 seconds up to 4 minutes as compared to the maximum of 30 seconds in the previously patented method. This additional time provides additional shear forces which free water from the sludge particles by division of polymer chains. These polymers are used in the treatment of sludge to accomplish coagulation and flocculation prior to settling and dewatering. The released free water on the surface of the divided sludge particles combines and reacts with the quicklime and thereby forms a paste-like mixture. This additional time period assures the accurate commingling and reacting of the quicklime with water contained in each sludge particle thereby assuring the destruction of microorganisms. The temperature of the reaction product rises to about 35° to 50° C.

The blender-reactor 4 is preferably operated by the motor in a continuous mode rather than in a batch mode. As additional sludge and quicklime are charged into compartment 1, an equal amount overflows from compartment 1 into compartment 2 where the material is subjected to the same dividing action caused by mixing o blending elements 5 operated by the motor. It is known in the art of charging additional dry material to so called "dust" the surfaces of the divided pasty material, that the result will be spherical agglomerates, or pellets, as previously disclosed in the applicant's U.S. Pat. No. 4,306,978. Therefore, the additional charging of beneficiating materials such as cement kiln dust, or lime kiln dust, into compartment 2 will result in the dusting and coating of the divided particles of pasty material formed in compartment 1. With the continual division of the new pasty material entering compartment 2 and the continual dusting with beneficiating material, spherical agglomerates are formed. It should be noted that the adherence of the dry beneficiating material to the divided surface of the pasty particles is due to the exposed wet surface of the particle. The result is that the beneficiating material containing calcium oxide will react in the presence of the water to form calcium hydroxide. The temperature ranges from 35° to 50° C.

Desirably, one would add sufficient beneficiating material such as cement kiln dust or lime kiln dust to first separate and isolate the agglomerates; to secondly supplement the calcium oxide content added in compartment 1 to thereby increase the pH to a selected level acceptable to destroy microorganisms, namely pH 11 to 13 and preferably pH 12; and thirdly to insure that there is a chemical reaction at the surface of the particle to form calcium hydroxide. The beneficiating material can be alkaline material added to said second compartment and comprises waste material containing from 5% to 75% by weight of kiln dust or an alkaline material capable of reacting with the free water in the sludge to form calcium hydroxide for ultimate conversion to calcium carbonate.

Coated agglomerates or pellets overflow into compartment 3 wherein carbon dioxide is charged either in a gaseous or solid state form. Desirably the amount of carbon dioxide added is at least 50 mol % based upon the moles of calcium hydroxide in the pellets. Also it is preferable that the molar ratio of carbon dioxide to calcium hydroxide ranges from 0.8 to 1.2:1. In other words there should be about a stoichiometric amount of carbon dioxide. As a gas, carbon dioxide flow rate is regulated from conventional gas cylinders. As a solid, carbon dioxide granules or flakes are dispensed from so called "dry ice" systems, such as those offered by the Airco Company, Murray Hill, N.J. It should be noted that the carbon dioxide can be 100% carbon dioxide, or alternately, a high percentage of carbon dioxide mixed with air. As previously mentioned, the atmosphere contains only 0.035% carbon dioxide whereas the present invention will utilize up to 100% carbon dioxide thereby assuring the rapid conversion of calcium hydroxide to calcium carbonate within the time period that the pellets are contained within the blender-reactor.

Compartment 1 is separated from compartment 2 by wall 8; and compartment is separated from compartment 3 by wall 10. Material moves between compartments 1 and 2 by overflowing over wall 8, and between compartments 2 and 3 by overflowing over wall 10.

When using solid carbon dioxide, the blending elements 5 of the blender-reactor rapidly and accurately incorporate the solid dry ice particles throughout the pellet mass so that particles of dry ice are adjacent to individual pellets. When sublimation occurs there is assurance that all pellet surface area is in contact with the resultant carbon dioxide gas. This change of state from solid carbon dioxide to gaseous carbon dioxide requires heat, which portion of heat is supplied by heat stored in each pellet as a result of the exothermic reaction between calcium oxide and the free water initially within the sludge. Due to the presence of a relatively high percentage of carbon dioxide surrounding each particle, as compared to the 0.035% in the atmosphere, an additional reaction takes place. The second reaction is between the calcium hydroxide previously formed in the pellet and the carbon dioxide thus resulting in the formation of calcium carbonate. The temperature ranges from 35° to 50° C.

A review of the chemical reactions follows:

1. Calcium oxide (quicklime) added to settled or dewatered sludge reacts with the free water in the sludge to yield calcium hydroxide plus heat.

$$CaO + H_2O = Ca(OH)_2 + heat$$

2. Calcium hydroxide formed in reaction 1 reacts with carbon dioxide to yield calcium carbonate and water.

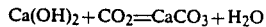

$$Ca(OH)_2 + CO_2 = CaCO_3 + H_2O$$

It should be noted that an intermediate, calcium bicarbonate, can be formed which is converted to calcium carbonate.

The available calcium oxide can be quicklime or the calcium oxide content of the kiln dusts.

In the pollution control industry, calcium carbonate may be formed as a hard, cementitious material often resulting in hard scale on contact parts and surfaces of equipment handling limed materials in the presence of carbon dioxide in the atmosphere. The result of the aforementioned chemical reactions is the provision of a calcium carbonate skin on the outer surface of individual pellets 6. Since the calcium carbonate skin is hard and cementitious by nature, the pellet is provided with a surface of high green strength. This provides the advantage that the pellets can be immediately handled by mechanical equipment for beneficial uses without the need for extended storage periods or storage space. Optionally, if weather conditions do not permit, the pellets are easily handled in and out of storage and readily aerated to complete a thorough drying of the pellets while in storage.

An additional advantage of the present invention is the production of calcium carbonate which is often preferred for application to cropland as compared to hydrated lime. Calcium carbonate degrades more slowly than hydrated lime thereby providing alkalinity to the soil over longer time periods.

Furthermore, it is advantageous to remove ammonia, if any, in sludge, with the ammonia resulting from known nitrogen compounds in wastewater. The problems associated with the disposal of sludge containing ammonia include, firstly, the noxious orders given off, and secondly, the possible eutriphication of streams, rivers and lakes when disposing of sludge on land near these waterways. The method of ammonia removal taught in applicant's U.S. Pat. No. 4,306,978 is hereby incorporated as an additional benefit, with the benefit being the capability to desorb ammonia within the same apparatus that additionally combines the steps of alkaline stabilization, beneficiating and pelletizing to high green strength pellets.

Various modifications and changes may, of course, be made as will be apparent to those skilled in the art. As an example, although the blender-reactor is well suited and highly advantageous to use, other suitable embodiments of conventional mixers may also be used, particularly when the material to be processed is non-hazardous, such as animal excrement. Such mixing equipment can be compartmented or can be arranged in series, such as paddle blenders, ribbon blenders, pug mills, both single or dual shaft, as well as combinations thereof. In addition, other suitable uses may be found for the pelletized product produced by the invention.

While only a single embodiment of the present invention has been shown and described, it is to be understood that many changes and modifications may be made thereunto without departing from the spirit and scope of the invention as defined in the appended claims.

What is claimed is:

1. An improved, high rate method for the alkaline stabilization, beneficiating and pelletizing of waste materials such as wastewater treatment plant sludge or animal excrement comprising the steps of:

settling or dewatering sludge so as to provide sludge cake containing 3% to 60% by weight of dry solids based upon the total weight with the balance up to 100% by weight being water based upon the total weight;

blending and reacting said sludge cake with calcium oxide added in a first compartment zone of a blender-reactor to form calcium hydroxide;

forming a pasty sludge mixture of sludge particles, thereby assuring a high selected pH of 11 to 13 for each sludge particle for disinfection and stabilization of the sludge as well as attaining the high pH necessary for the release of ammonia gas; said particles having free water at the surface thereof;

overflowing the pasty sludge mixture into a second compartment zone of the blender-reactor to continue the reaction of calcium oxide with the free water at the surface of each particle to thereby continue to form calcium hydroxide and raise the pH of the mixture to said high selected pH, and wherein in said second compartment, beneficiating material is charged to produce coated sludge pellets, which pellets are thereby supplemented with additional nutrients contained in the beneficiating material to improve the products value for agricultural, horticultural or sylvicultural purposes;

overflowing the coated sludge pellets into a third compartment zone of the blender-reactor and reacting said pellets with carbon dioxide gas added to said third compartment while continually exposing pellet surface to said gas, thereby immediately forming calcium carbonate as a result of the reaction of calcium hydroxide and carbon dioxide gas, said carbonate forming a cementitious, hard skin on the pellet surface thereby providing high green strength for said pellet; and discharging said pellets for immediate handling by mechanical equipment without breakdown of the pellets.

2. A method according to claim 1, wherein said calcium oxide added to the first compartment is provided in the form of quicklime or combinations of quicklime with waste material comprising cement kiln dust or lime kiln dust.

3. A method according to claim 1, wherein said beneficiating material is alkaline material added to said second compartment and comprises waste material containing from 5% to 75% by weight of kiln dust or an alkaline material capable of reacting with the free water in the sludge to form calcium hydroxide for ultimate conversion to calcium carbonate.

4. A method according to claim 1, wherein the carbon dioxide added is at least 50 mol % based upon the moles of calcium hydroxide in the pellets.

5. A method according to claim 1, wherein the blender-reactor can be a three compartment zone plow blender-reactor, pug mill, paddle blender, helical blender or blenders of equal efficiency.

6. A method according to claim 1, further comprising desorbing ammonia in the first compartment of the blender-reactor.

7. In a process for providing a soil conditioner and fertilizer supplement for agricultural, horticultural, or sylvicultural use, the improvement which comprises utilizing the product produced from waste materials according to claim 1 as said soil conditioner and fertilizer supplement.

* * * * *